(12) United States Patent
Naval, Jr. et al.

(10) Patent No.: US 11,612,148 B2
(45) Date of Patent: Mar. 28, 2023

(54) ESTIMATING FISH SIZE, POPULATION DENSITY, SPECIES DISTRIBUTION AND BIOMASS

(71) Applicant: UNIVERSITY OF THE PHILIPPINES, Quezon (PH)

(72) Inventors: Prospero C. Naval, Jr., Quezon (PH); Laura T. David, Quezon (PH)

(73) Assignee: UNIVERSITY OF THE PHILIPPINES, Quezon (PH)

( * ) Notice: Subject to any disclaimer, the term of this patent is extended or adjusted under 35 U.S.C. 154(b) by 893 days.

(21) Appl. No.: 16/501,738

(22) PCT Filed: Dec. 13, 2017

(86) PCT No.: PCT/PH2017/000010
§ 371 (c)(1),
(2) Date: May 29, 2019

(87) PCT Pub. No.: WO2018/111124
PCT Pub. Date: Jun. 21, 2018

(65) Prior Publication Data
US 2021/0289759 A1    Sep. 23, 2021

(30) Foreign Application Priority Data

Dec. 15, 2016   (PH) .............................. 12016000469

(51) Int. Cl.
*A01K 61/95*        (2017.01)
*G01B 11/04*        (2006.01)
(Continued)

(52) U.S. Cl.
CPC .............. *A01K 61/95* (2017.01); *G03B 17/08* (2013.01); *G03B 17/561* (2013.01); *G06N 3/08* (2013.01);
(Continued)

(58) Field of Classification Search
None
See application file for complete search history.

(56) References Cited

U.S. PATENT DOCUMENTS 5,692,064 A * 11/1997 Takagi ................... G06M 1/101
382/206
2022/0071180 A1 * 3/2022 Chrobak ............... G06T 7/0012

OTHER PUBLICATIONS

Meng-Che Chuang, "Automatic Video Analysis for Fisheries Survey Systems," Dissertation, University of Washington, 2015) (Year: 2015).*

(Continued)

*Primary Examiner* — Soo Shin
(74) *Attorney, Agent, or Firm* — Nixon Peabody LLP; Jeffrey L. Costellia

(57) ABSTRACT

A computerized system of performing fish census which otherwise requires high level of domain knowledge and expertise is described. Divers with minimal knowledge of fish can obtain high quality population and species distribution measurements using a stereo camera rig and fish video analyzer software that was developed. The system has two major components: a camera rig and software for fish size, density and biomass estimation. The camera rig consists of a simple stand on which one to four pairs of stereo cameras are mounted to take videos of the benthic floor for a few minutes. The collected videos are uploaded to a server which performs stereo analysis and image recognition. The software produces video clips containing estimates of fish size, density and species biodiversity and a log report containing information about the individual fishes for further end user analysis.

8 Claims, 9 Drawing Sheets
(5 of 9 Drawing Sheet(s) Filed in Color)

(51) Int. Cl.

| | |
|---|---|
| *G03B 17/08* | (2021.01) |
| *G03B 17/56* | (2021.01) |
| *G03B 37/04* | (2021.01) |
| *G06M 1/10* | (2006.01) |
| *G06M 11/00* | (2006.01) |
| *G06N 3/08* | (2006.01) |
| *G06T 7/593* | (2017.01) |
| *G06T 7/60* | (2017.01) |
| *G06T 7/80* | (2017.01) |
| *G06V 20/05* | (2022.01) |
| *G06V 40/10* | (2022.01) |

(52) U.S. Cl.
CPC ............... *G06T 7/593* (2017.01); *G06T 7/60* (2013.01); *G06T 7/85* (2017.01); *G06V 40/10* (2022.01); *G06T 2207/10021* (2013.01); *G06T 2207/10024* (2013.01); *G06T 2207/10028* (2013.01); *G06T 2207/20084* (2013.01); *G06T 2207/20132* (2013.01); *G06T 2207/30242* (2013.01)

(56) References Cited

OTHER PUBLICATIONS

Shortis et al., "Progress in the automated identification, measurement and counting of fish in underwater image sequences," Marine Technology Society Journal, vol. 50, No. 1, Feb. 2016, pp. 4-16 (Year: 2016).*

Gutierrez-Heredia et al., "End to End Digitsation and Analysis of Three-Dimensional Coral Models, from Communities to Corallites," PLoS ONE, 11(2):e0149641 (Year: 2016).*

Tillett et al., "Model-based Stereo Imaging for Estimating the Biomass of Live Fish." In: Graves, M., Batchelor, B. (eds) Machine Vision for the Inspection of Natural Products. Springer, London, https://doi.org/10.1007/1-85233-853-9_12 (Year: 2003).*

Prospero C. Naval, Jr. et al., "FishDrop: Estimation of Reef Fish Population Density and Biomass using Stereo Cameras", 2016, TECHNO-OCEAN, IEEE, Oct. 6, 2016, pp. 527-531.

International Search Report for Application No. PCT/PH2017/000010, dated Aug. 6, 2018.

* cited by examiner

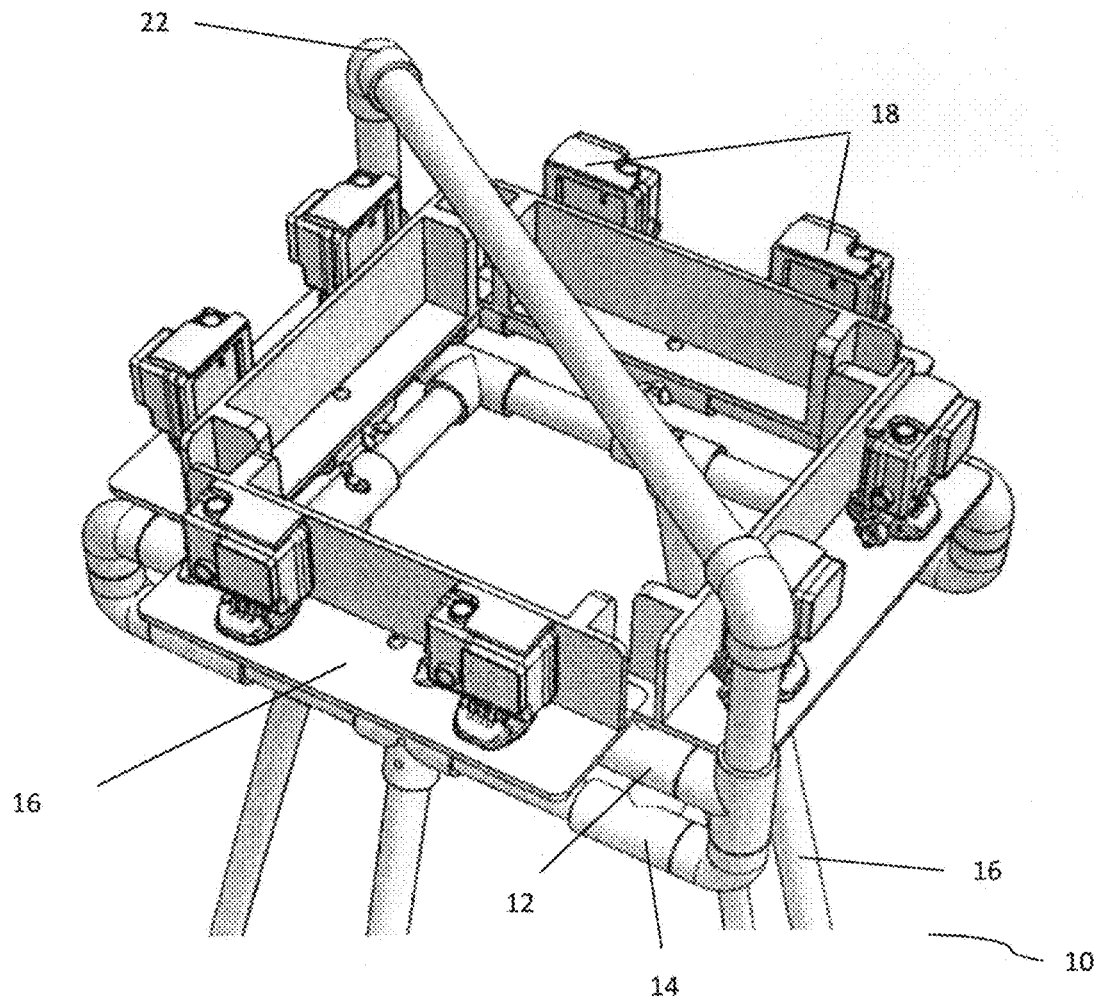
FIGURE 7-A

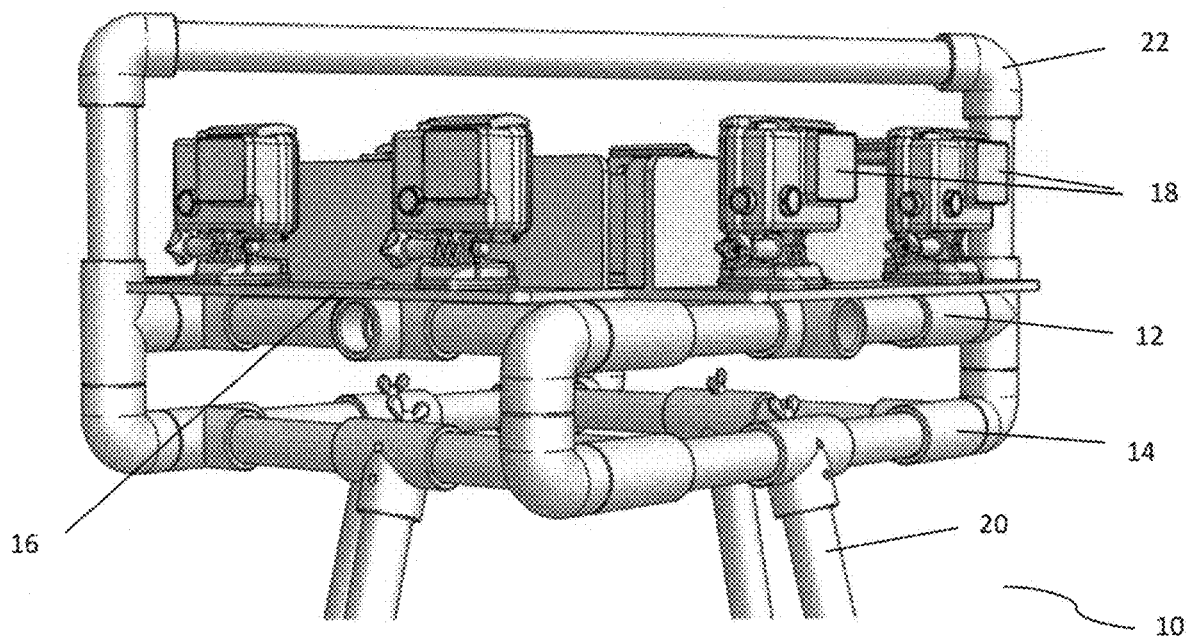
FIGURE 7-B

ESTIMATING FISH SIZE, POPULATION DENSITY, SPECIES DISTRIBUTION AND BIOMASS

FIELD OF INVENTION

This invention relates to a method for estimating fish size, population density, species distribution and biomass underwater. A computerized system for the said method is particularly described.

BACKGROUND OF THE INVENTION

Underwater Visual Census (UVC) methods for fish population density measurements date back to the 1950s [1] [2] [3] and have long since been adopted as the standard for marine ecosystem monitoring. Alternative sampling methods include the use of explosives or ichyocides, hook and line, trapping and trawling [4]. The main advantages of UVC over these sampling techniques are its non-destructive nature, repeatability and cost effectiveness.

There are two common types of UVC sampling techniques in use: line transects and point counts. In the line transect method, a scuba diver swims for a predetermined distance (e.g., 50 meters) along a central transect line (usually a tape measure of a predetermined length) while recording the counts and species of fishes that are visible within 2.5-meter or 5-meter distance on either side of the transect. In the Point Count Method, a diver records for a fixed time (e.g., 10 minutes) all the fish visible within a circle with 7.5-meter or 10-meter radius [5] [6].

UVC methods suffer from the following biases that tend to underestimate fish density measurements: fish behavioural response to diver's presence (agitation or attraction), diver's skill in accurately counting and identifying fish, and diver fatigue. Quite often the diver is burdened with the decision to include or exclude an individual fish as it moves into or away from the sample area. In difficult cases, the diver has to decide whether the fish was inside or outside the area when it was first sighted [7].

In recent years, video cameras have been deployed for unattended video capture by underwater observatories in midwater and benthic habitats. Subsequent analysis of the collected video is tedious and time consuming requiring intense human concentration which often result in human fatigue. Estimates for time spent for manual annotation and classification specify around 15 minutes for every minute of video [8]. It is therefore evident that machine-assisted analysis is necessary to simplify the process and reduce errors.

SUMMARY OF THE INVENTION

The present invention is a semi-automated stereovision-based Underwater Visual Census system. The invention automates the process of performing fish census which otherwise requires high level of domain knowledge and expertise. With the invention, even divers with minimal knowledge of fish can obtain high quality population and species distribution measurements using a stereo camera rig and fish video analyzer software that we have developed. A permanent visual record of the census is available for later review and archiving.

In particular, the invention describes a method for estimating fish size, population density, species distribution and biomass underwater comprising: capturing videos of fish underwater with at least one paired cameras in at least one point underwater, wherein the paired cameras are pre-calibrated underwater to determine their intrinsic, extrinsic and distortion parameters; converting the videos from the first camera in the paired cameras into first image frames and the videos from the second camera in the paired cameras into second image frames, each image frame comprising a multiplicity of pixels; processing the first and second image frames by: detecting fish images in the first and second image frames; generating fish blobs from the fish images; generating bounding boxes from the fish blobs; undistorting and rectifying the first and second image frames to produce undistorted and rectified first and second image pairs by applying the calibration parameters; using the fish blobs as image masks to isolate fish images from the undistorted rectified images and produce cropped fish images; generating a disparity map of pixels from the undistorted rectified first and second image pairs; calculating three dimensional world coordinates of points corresponding to each pixel in the disparity map to generate a point cloud; applying the image masks to the point cloud to produce a fish-masked point cloud; and computing pixel coordinates of the fish blob bounding boxes from the cropped fish mask images;

The length of each fish is computed from the bounding box horizontal coordinate difference between the pixels corresponding to the fish snout and tail, and camera parameters.

The population density is computed by defining a three dimensional volume in the disparity map and counting the fish within the said volume.

The fish species is identified by: pre-collecting cropped fish images; extracting color, shape and texture features from the pre-collected cropped fish images; assigning a fish species for each extracted color, shape and texture feature; extracting color, shape and texture features from the cropped fish images; and matching according to similarity the color, shape and texture features of the cropped fish images with the color, shape and texture features of the pre-collected cropped fish images;

The fish biomass is computed given the species and length from a database of fish constants.

The calibration of the paired cameras is done preferably by capturing images of a regular geometric pattern at different positions and orientations; transferring the images of the regular geometric pattern to a computer; and calculating the intrinsic, extrinsic and distortion parameters of the paired cameras using Bouguet's method.

The capturing of the videos of fish underwater preferably comprises: attaching the paired cameras to a rig; placing the camera rig at one end of a transect line; taking at least two minutes of videos at the one end of the transect line; moving the camera rig to a point on the transect line; taking another at least two minutes of videos on the point on the transect line; repeating the moving of the camera rig along the transect line and taking of the videos until the camera rig reaches another end of the transect line.

Preferably, the camera rig for capturing videos of fish underwater comprises: a multi-sided frame; a camera bracket mount on at least one side of the frame; a plurality of stands supporting the frame; a handle bar diagonally attached to the frame; wherein each stand is rotationally coupled to the frame with an adjustable angle relative to the frame and the camera bracket mount is rotationally coupled to the frame with an adjustable tilt. The stands of the camera rig preferably extend at oblique angles to stabilize the frame.

In a preferred embodiment of the invention, there is a computerized system for estimating fish size, population density, species distribution and biomass underwater, the said system comprising: at least one paired cameras that is pre-calibrated for taking videos underwater; a rig for mounting the paired cameras; a processing unit; a memory storage device; a display device coupled to the processing unit for displaying data; and a program module for providing instructions to the processing unit, the processing unit responsive to the instructions of the program module, operable for: converting the videos from the first camera in the paired cameras into first image frames and the videos from the second camera in the paired cameras into second image frames, each image frame comprising a multiplicity of pixels; processing the first and second image frames by: detecting fish images in the first and second image frames; generating fish blobs from the fish images; generating bounding boxes from the fish blobs; rectifying and undistorting the first and second image frames to produce undistorted and rectified first and second image pairs by applying the calibration parameters; using the fish blobs as image masks to isolate fish images from the undistorted rectified images and produce cropped fish images; generating a disparity map of pixels from the undistorted rectified first and second image pairs; calculating three dimensional world coordinates of points corresponding to each pixel in the disparity map to generate a point cloud; applying the image masks to the point cloud to produce a fish-masked point cloud; and computing pixel coordinates of the fish blob bounding boxes from the cropped fish mask images.

The preferred embodiment of the invention is operable for: (a) computing the length of each fish by determining the bounding box horizontal coordinate difference between the pixels corresponding to the fish snout and tail; (b) computing the population density by defining a three dimensional volume in the disparity map and counting the fish within the said volume; (c) identifying a fish species by: pre-collecting cropped fish images; extracting color, shape and texture features from the pre-collected cropped fish images; assigning a fish species for each extracted color, shape and texture feature; extracting color, shape and texture features from the cropped fish images; and matching the color, shape and texture features of the cropped fish images with the color, shape and texture features of the pre-collected cropped fish images; and (d) computing the fish biomass given the species and length from a database of fish constants.

Preferably, the maximum number of fish over all the image frames is further calculated the fish species, fish length, biomass, and population density values and maximum number of fish are displayed on the image frames.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

FIG. 7-A is a perspective view of the frame of the camera rig with cameras mounted therein.

FIG. 7-B is side view of the frame of the camera rig with cameras mounted therein.

DETAILED DESCRIPTION

The invention has the following main components: a stereo camera rig system with mounts for four camera pairs and software for calculating fish size, population density and biomass values from fish video recordings.

The camera rig consists of a simple frame with four stands on which one to four pairs of stereo cameras are mounted and with the camera axes oriented parallel to the seabed. During data collection, the cameras take videos for a few minutes (e.g., 2 to 5 minutes) recording all fishes within their field of view. The rig is moved five meters forward along a transect line and held there for the same amount of time. This process is repeated until 10 such video samples are obtained. The collected videos are uploaded to a server which performs stereo analysis and image recognition. The software produces video clips containing estimates of fish size, density and species biodiversity and a log report for further end user analysis.

A. The Camera Rig

Figure 7:
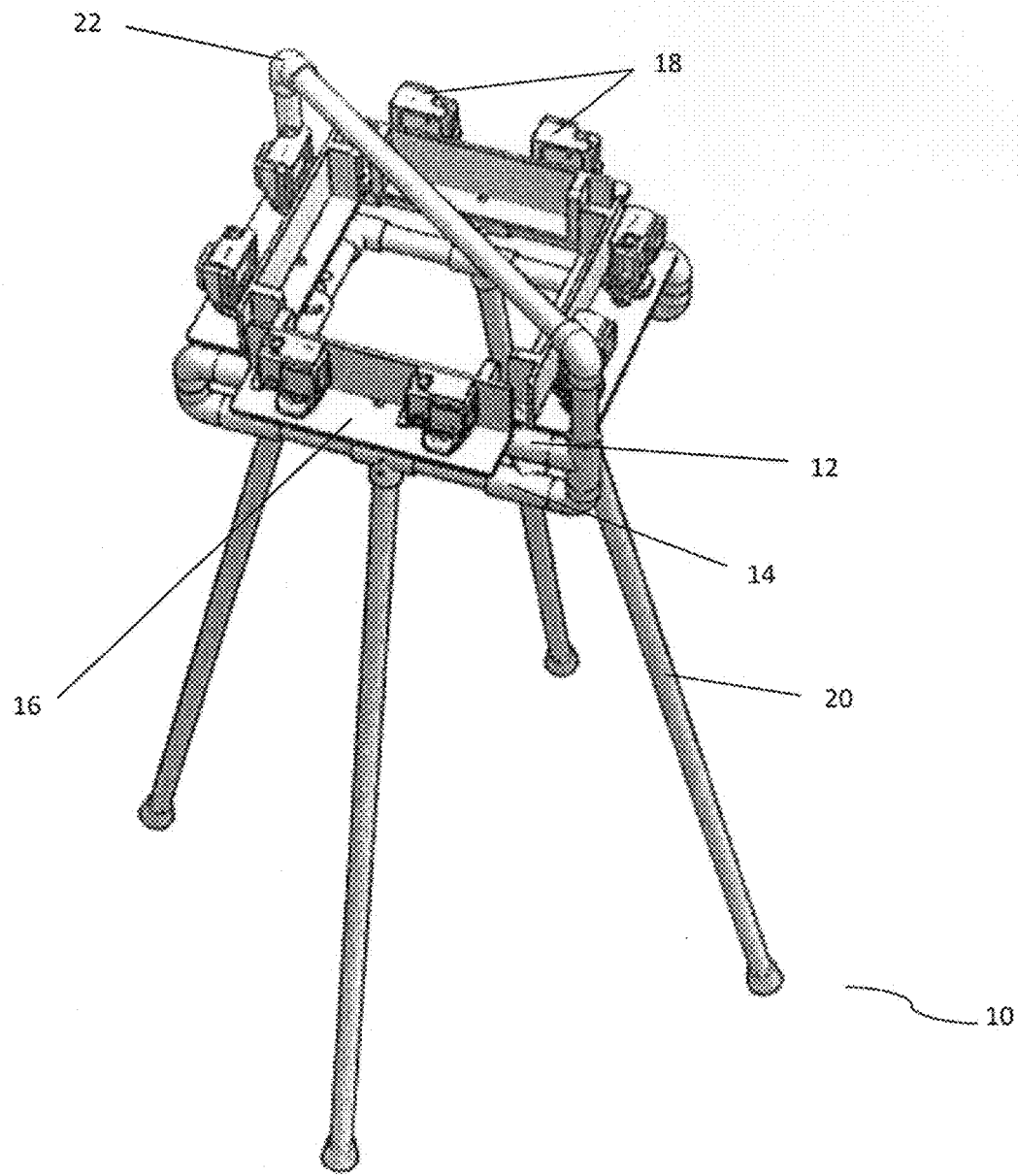
FIG. 7 is a perspective view of the camera rig with cameras mounted therein.

As shown in FIGS. 7 to 7-B, the camera rig (10) consists of an upper square frame (12) and a lower square frame (14) with a camera bracket mount (16) on each side of the upper square frame (12). A camera pair (18) is mounted on the camera bracket mount (16).

The lower square frame (14) is supported by four stands (20) which extend at oblique angles to: (a) provide stability against the forces caused by underwater currents; and (b) conform to the uneven and or sloping seabed topography. The camera bracket mount (16) ensures that: (a) the cameras (18) are separated by a fixed baseline distance; and (b) the optical axes of the cameras (18) are fixed at a constant angle to assume parallel, toe-in, or off-axis configurations.

The camera bracket mount (16) is rotationally coupled to the upper square frame (12) with an adjustable tilt that allows the cameras pairs (18) to point towards the seafloor horizon. A handle bar (22) is diagonally attached to, and connects the, upper square frame (12) and lower square frame (14) to facilitate underwater transport of the camera rig (10).

The direction of the camera pairs (18) are 0, 90, 280, and 270 degrees relative to the transect line direction. The upper square frame (12) elevates the camera pairs at a fixed distance above the seafloor.

When performing measurements, the camera rig (10) is positioned at a suitable height so that the camera pairs (18) can efficiently capture fish videos.

The cameras (18) used are one to four pairs of GoPro Hero 3+ Black or Hero 4 Silver cameras fitted with red filters and mounted on the brackets. The camera settings are as follows: 24 frames per second, Wide Field of V, 1080p. The baseline distance for the stereo pair is fixed at 20 cm. When using four pairs, the stereo pairs are oriented at the four cardinal directions. The camera rig (10) is positioned at a suitable height of around 1 meter above the seabed such that the stereo camera pairs can efficiently capture fish videos. Camera pair synchronization is achieved through simultaneous powering on of the cameras using the WiFi remote controller. Prior to deployment, a smartphone LED flasher is also shown to the cameras to provide additional synchronization cues.

B. Underwater Stereo Camera Calibration

Figure 1:
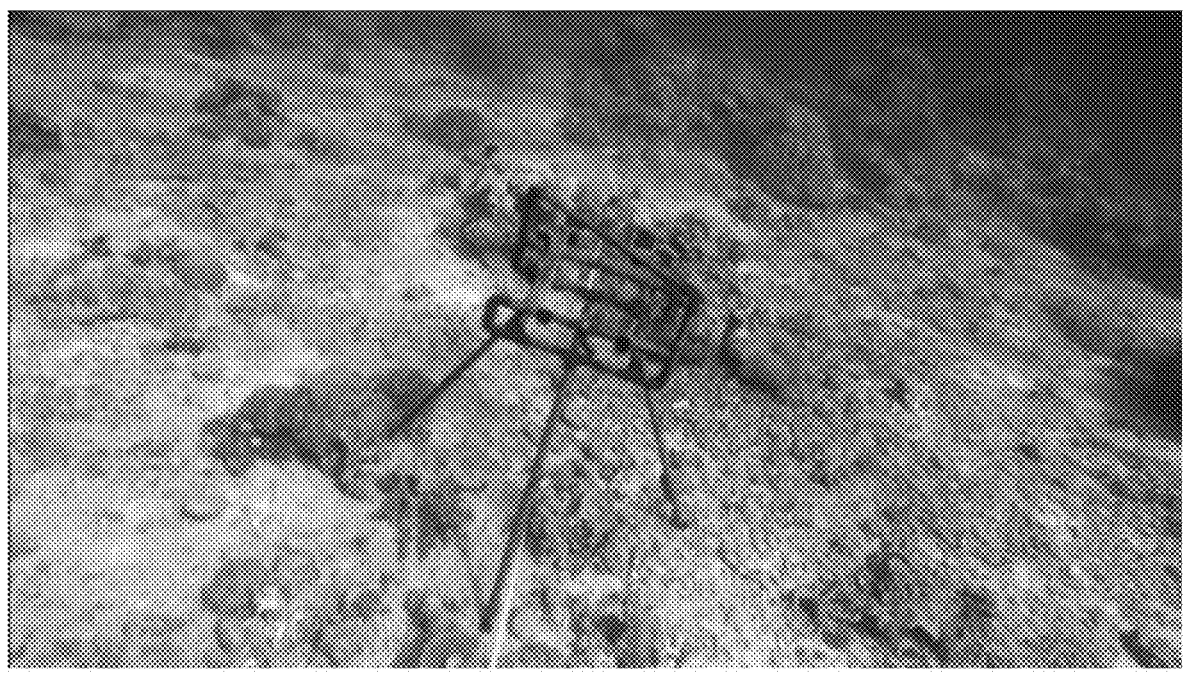
FIG. 1 shows the camera rig underwater.
Figure 2:
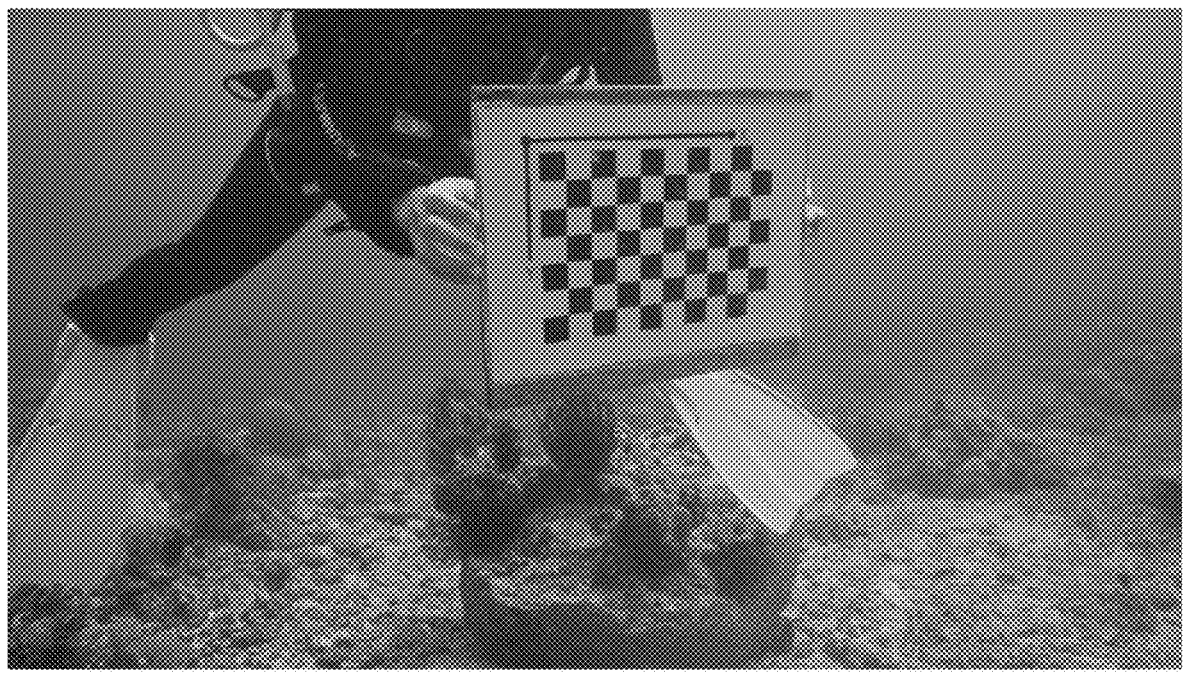
FIG. 2 shows the calibration of the cameras underwater.

The purpose of camera calibration is to determine the intrinsic, extrinsic and distortion parameters of each camera pair which will be used for stereo analysis. Owing to the difference of the index of refraction of water and air, this calibration step must be done underwater. A diver positions, while underwater, a checkerboard camera calibration pattern in front of the stereo cameras in order to capture several images of the pattern at different orientations and positions (FIG. 2). Calibration for all the pairs typically takes about 1 to 2 minutes.

Once the camera rig (10) is brought back to the surface at the end of the data collection process, the calibration video is transferred to a computer. A camera calibration algorithm analyzes representative images and outputs the camera parameters for each stereo camera pair. The intrinsic, extrinsic and distortion parameters of the paired cameras are then calculated using standard formulas known in the art, including Bouguet's method [9].

C. Fish Video Data Collection

Figure 3:
FIG. 3 shows the collection of videos underwater using the camera rig along the transect line.

The camera rig (10) is placed at the origin of the transect line while fish video is collected for a period of 2 minutes or longer (FIG. 3). In order to minimize disturbance to the fishes in the rig vicinity, the diver moves away from the camera rig (10) while the cameras are recording fish video samples. This process is repeated every 5 meters moving along the transect line until the entire 50 meter transect is covered. When the data collection process is over, the camera rig (10) is brought back to the surface and the collected video files are transferred to a computer for analysis. All collected videos are converted into image frames for subsequent processing.

Video Analysis Software

Fish video processing starts with conversion of collected videos into image frames on which a fish segmentation algorithm is applied to produce fish blobs which are the basis of the fish counts. Image rectification is applied on the corresponding stereo frames to produce undistorted rectified image pairs on which a disparity map and subsequently a point cloud is generated. The 3D coordinates for each detected fish are computed from the point cloud. A three dimensional volume in front of the midpoint of the stereo camera pair is then defined. Fishes whose centroids are contained within this volume are counted while those outside it are ignored. Population density is computed from the fish count within the volume. For species identification we used a Convolutional Neural Network to perform fish image classification. Fish biomass is estimated through a formula relating fish length and biomass.

Figure 4:
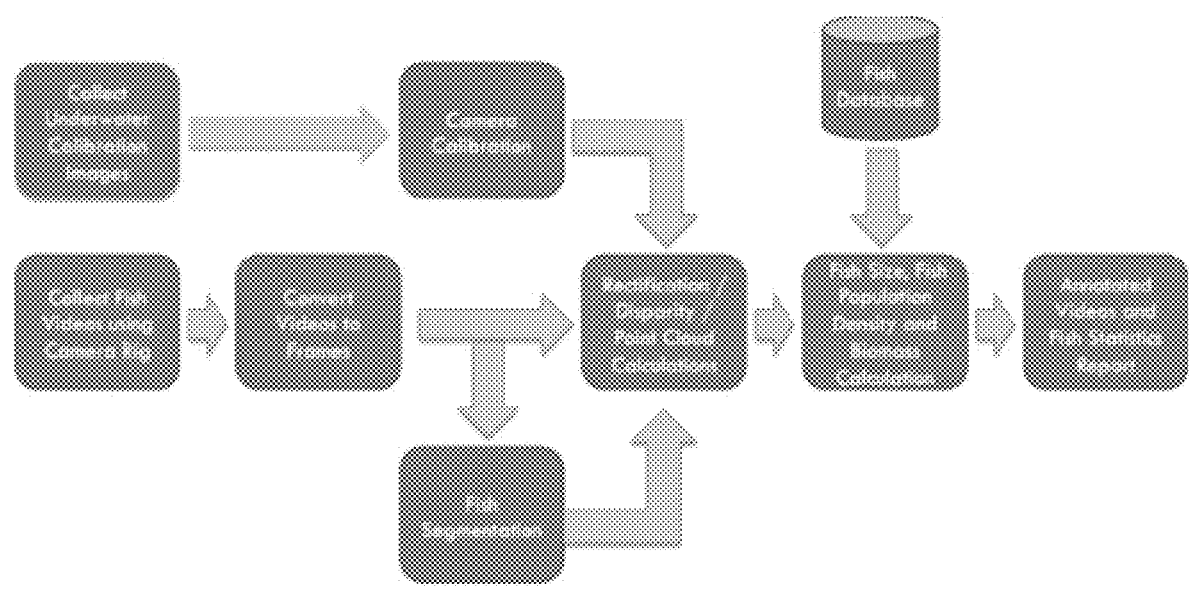
FIG. 4 is a flowchart of the processes used in the invention.

The Video Analyzer calculates fish size, population density and biomass values from fish videos captured by the stereo cameras through the following processing steps (see FIG. 4):

A. Fish Segmentation

Figure 5:
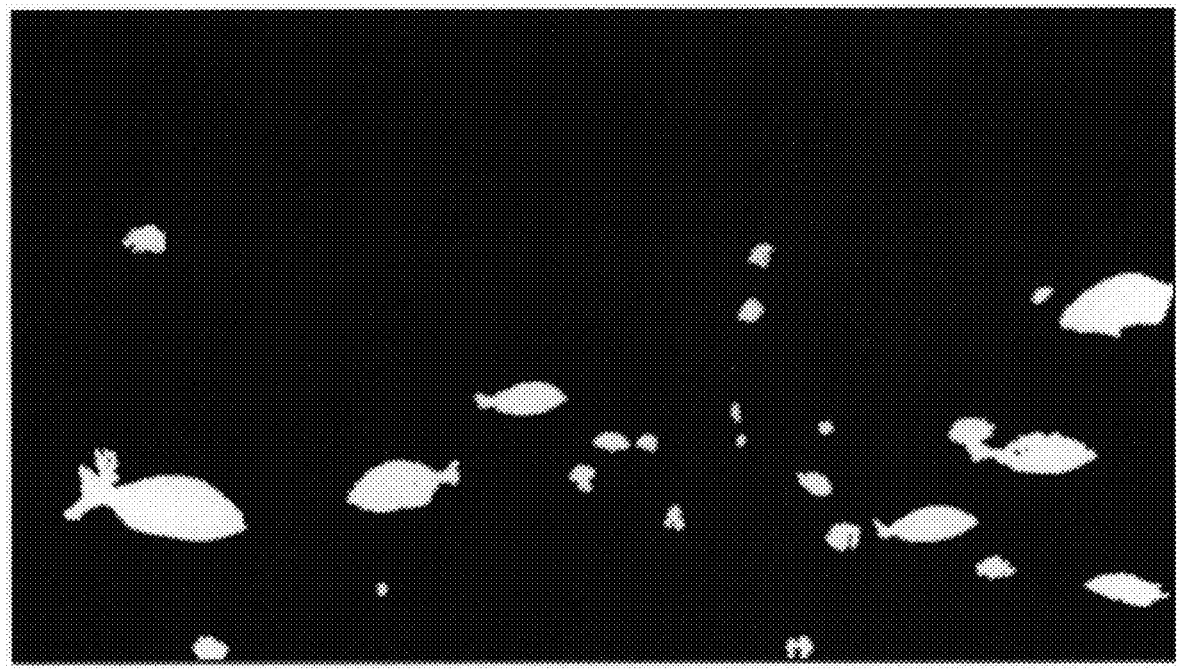
FIG. 5 shows the segmented fish blobs generated by the invention.

Fish segmentation is an image processing step that isolates the fish foreground from the blue water and benthic background (FIG. 5). A motion-based fish segmentation algorithm generates "fish blobs" from the image frames which are validated and subsequently counted by the fish count algorithm. Bounding boxes are generated from these blobs for later use.

B. Stereo Analysis

The objective of the stereo analysis step is to calculate the 3D coordinates of the image centroid and size of each fish from the validated fish blobs produced by the Fish Segmentation step.

The intrinsic, extrinsic and distortion parameters of the stereo camera pairs obtained from the Camera Calibration step are necessary for this step. Stereo analysis begins with the application of the image rectification algorithm on corresponding stereo frames to produce undistorted and rectified image pairs. From these images, the stereo disparity algorithm generates a disparity map. The 3D reconstruction algorithm then calculates the 3D world coordinates of points corresponding to each pixel in the disparity map. The resulting output is a point cloud. Next, the validated fish blobs are used as image masks to isolate the fish images from the rectified images. The image masks are also applied to the point cloud yielding the fish-masked point cloud. The resulting point cloud contains the 3D world coordinates corresponding to the image pixels of each isolated fish image.

C. Calculation of Fish Size and Population Density

The Stereo Analysis step produces rectified images and a point cloud. Given rectified images and point cloud as inputs, the length of each fish is computed from the pixel horizontal coordinate difference between the fish snout and tail. The centroid (in 3D world coordinates) of each fish is computed from the midpoint of these two image points.

A three dimensional volume with dimensions of 500 cm×500 cm×500 cm with origin at 200 cm in front of the midpoint of the stereo camera pair is then defined. Fishes whose centroids are contained within this volume are counted while those outside it are ignored. Population density is computed from the fish count within the volume.

D. Fish Species Identification

Conventional pattern recognition techniques for fish classification rely on handcrafted features based on color, shape and texture for subsequent processing by a classifier. The invention employs a Convolutional Neural Network (CNN) for fish species identification which does not use handcrafted features. Instead, efficient feature representations are learned automatically by the algorithm.

Fish blob bounding boxes obtained from the segmentation procedure are used to generate cropped fish images. A collection of these images for each species are set aside for training the CNN classifier. Once trained, the classifier will output the fish species label and its corresponding probability given a cropped input image.

E. Biomass Calculation

Fish biomass calculation relies on the following formula that relates fish length and mass for a certain species [10]:

$$mass = aL^b$$

where L is the fish length and a and b are constants specific to the species.

Fish biomass is computed after the fishes have been identified by the classifier and their lengths measured. This requires consulting a database of fish constants. The calculation is done for each fish obtained in the Fish Identification step whose coordinates are within the defined volume.

F. Fish Video Annotation

Once the fish size and biomass information are available, each fish is labeled with its corresponding values. The population density values are also displayed together with the maximum number of fishes found over all the image frames (Max N). The species distribution count and total biomass with the defined volume are also displayed. This procedure is done for each frame which are then assembled back as an annotated video for the user.

G. Temporal Processing and Report Generation

Figure 6:
FIG. 6 is a screenshot of an annotated output video of the invention.

Since the fishes are constantly in motion, the measured length and computed biomass are constantly changing. The fish species label may also become unreliable when the fish is imaged frontally. An interframe coherence algorithm ensures that the fish size, biomass values and species labels are consistent across all frames for the entire annotated video. A report containing the size, species and biomass information for each fish is generated and stored as a csv file for further analysis by the user. One frame of the resulting video annotation is shown in FIG. 6.

The camera rig was field tested for portability and ease of use in more than 20 different sites across the Verde Island Passage, Philippines. Several versions of the rig were fabricated after taking into account feedback from users.

The protocol for performing a stereo-camera-assisted underwater visual census consists of the following steps:
1) diver looks for a suitable census area and reels out a 50 meter transect line
2) camera rig is positioned at the origin of the transect line
3) camera calibration is performed by slowly rotating a calibration checkerboard in front of the cameras
4) rig is slowly rotated in order for the cameras to capture, through video, additional benthic information (coral cover, reef slope, general topographic complexity, etc.) for later viewing
5) rig is oriented with the front camera pairs facing the transect line and diver moves away from the rig in the opposite transect direction in order not to disturb the fish
6) cameras collect fish video data for 2 to 5 minutes while ensuring that the rig is immobile even in the presence of currents
7) diver moves the rig 5 meters forward in the direction of the transect
8) steps 4 to 8 are repeated until the entire 50 meter transect is covered
9) rig is brought to the surface A. Fish Identification Accuracy The accuracy of fish identification depends on how well the segmentation algorithm works and on the accuracy of the CNN classifier. We measure the performance of the these algorithms on 20 two-minute clips from fish videos taken from 20 different sampling sites in the Verde Island Passage, Philippines. The videos were obtained at different depths, times of day, and visibility conditions. An inclusion criterion of at least 10 meter visibility was imposed. Segmentation and classifier performances are found in Tables I and II.

TABLE 1

SEGMENTATION ALGORITHM

| Precision | Recall |
|---|---|
| 0.71 | 0.94 |

TABLE II

CNN CLASSIFIER PERFORMANCE

| Number of Species | Accuracy |
|---|---|
| 25 | 96.1% |
| 182 | 91.3% |

The precision and recall values were obtained from 300 randomly selected segmented images. Classifier performance was measured for a 25-class and 182-class Convolutional Neural Network (fine-tuned AlexNet on Caffe) [11] [12]. The low precision performance of the segmentation algorithm is due to the presence of water particles that are mistaken for fish blobs, which is compensated for by introducing a "non-fish" class for the CNN. Average processing time on a 3.6 GHz Core i7-4790 8-core machine with an NVIDIA GeForce GTX 980 Ti GPU running Matlab R2016a on Ubuntu 10.04 is 6.1 hours per minute of video.

It was observed that overall performance degrades at shallower depths (≈5 meters) due to the lensing effect of waves at the surface which confuses our motion-based segmentation algorithm. This effect is minimal at greater depths 10 meters) and during overcast conditions.

CONCLUSION

Fish population density and biomass estimation are important activities for monitoring the health of tropical marine environments. The underwater visual census carried out by a trained diver is the standard monitoring method of quantifying reef protection and rehabilitation initiatives. A low-cost stereo camera rig consisting of one or more camera pairs is proposed as an alternative tool for performing high quality reef fish census. Software that rely on advanced video analysis techniques allow regular divers to obtain high quality population density, species distribution and biomass measurements even without marine science domain knowledge.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

REFERENCES

[1] V. E. Brock, "A preliminary report on a method of estimating reef fish populations", *J. Widel. Manag.*, vol. 18, pp. 297-308, 1954.
[2] Odum, H. T., E. P. Odum, Trophic structure and productivity of a windward coral reef community on Eniwetok Atoll, Marshall Islands, *Ecological Monograph,* 25: 291-320, 1955.
[3] S. English, C. Wilkinson, V. Baker (eds). "Survey manual for tropical marine resources (2nd ed). *Australian Institute of Marine Science, ASEAN—Australia Marine Science Project,* 390 pp., 1997.
[4] Watson, D., A review of techniques for assessing changes in fish assemblages, University of Western Australia.
[5] J. A. Bohnsack and S. P. Bannerot, "A stationary visual census technique for quantitatively assessing community structure of coral reef fishes", *NOAA Tech. Rep. NMFS,* 41: 1-5, 1986.
[6] M. A. Samoilys and G. Carlos, "Determining methods of underwater visual census for estimating the abundance of coral reef fishes", *Environ. Biol. Fish.,* 57: 289-304, 2000.
[7] N. L. Andrew and B. D. Mapstone, "Sampling and the description of the spatial pattern in marine ecology", *Oceanogr. Mar. Biol., Ann. Rev., vol.* 25, pp 39-90, 1987.
[8] C. Spampinato, D. Giordano, R. Di Salvo, Y. H. Chen-Burger, R. B. Fisher, G. Nadarajan, "Automatic Fish Classification for Underwater Species Behavior Understanding", *Proc. First ACM International Workshop on Analysis and Retrieval of Tracked Events and Motion in Imagery Streams,* 45-50, 2010.
[9] J. Y. Bouguet and P. Perona, "Camera calibration from points and lines in dual-space geometry", *Technical Report,* California Institute of Technology, 1998.

[10] Y. Letourneur, M. Kulbicki, and P. Labrosse, "Length-weight relationship of fishes from coral reefs and lagoons of New Caledonia—An update Naga, *ICLARM quart.* (21):4:39-46, 1998.

[11] A. Krizhevsky, I. Sutskever, and G. Hinton, "ImageNet classification with deep convolutional neural networks", *NIPS,* 2012.

[12] Y. Jia, "Caffe: an open source convolutional architecture for fast feature embedding", http://caffe.berkeleyvision.org/, 2013.

The invention claimed is:

1. A method for estimating fish size, population density, species distribution and biomass underwater comprising:
   capturing videos of fish underwater with at least one paired cameras comprising a first camera and a second camera in at least one point underwater, wherein the paired cameras are pre-calibrated underwater to determine intrinsic, extrinsic and distortion parameters;
   converting the videos from the first camera in the paired cameras into first image frames and the videos from the second camera in the paired cameras into second image frames, each image frame comprising a multiplicity of pixels;
   processing the first and second image frames by:
   detecting fish images in the first and second image frames;
   generating fish blobs from the fish images;
   generating bounding boxes from the fish blobs;
   undistorting and rectifying the first and second image frames to produce undistorted and rectified first and second image frames by applying the calibration intrinsic, extrinsic and distortion parameters;
   using the fish blobs as image masks to isolate the fish images from the undistorted and rectified image pairs and produce cropped fish images;
   generating a disparity map of pixels from the undistorted and rectified first and second image pairs;
   calculating three dimensional world coordinates of points corresponding to each pixel in the disparity map to generate a point cloud;
   applying the image masks to the point cloud to produce a fish-masked point cloud; and
   computing pixel coordinates of the fish blob bounding boxes from the cropped fish images;
   computing the length of each fish from each of the bounding boxes horizontal coordinate difference between the pixels corresponding to the fish snout and tail;
   computing the population density by defining a three dimensional volume in the disparity map and counting the fish within the said volume;
   identifying a fish species by:
   pre-collecting cropped reference fish images;
   extracting color, shape and texture features from the pre-collected cropped reference fish images;
   assigning a fish species for each extracted color, shape and texture feature;
   extracting color, shape and texture features from the cropped fish images; and
   matching according to similarity the color, shape and texture features of the cropped fish images with the color, shape and texture features of the pre-collected cropped reference fish images; and
   computing the fish biomass given the species and length from a database of fish constants.

2. The method of claim 1 wherein the pre-calibrating of the paired cameras comprises:
   capturing images of a checkerboard pattern or a geometric pattern at different positions and orientations;
   transferring the images of the checkerboard pattern or the geometric pattern to a computer; and
   calculating the intrinsic, extrinsic and distortion parameters of the paired cameras using Bouguet's method.

3. The method of claim 1 wherein the capturing of the videos of fish underwater comprises:
   attaching the paired cameras to a camera rig;
   placing the camera rig at one end of a transect line;
   taking at least two minutes of videos at the one end of the transect line;
   moving the camera rig to a point along the transect line;
   taking another at least two minutes of videos on the point along the transect line;
   repeating the moving of the camera rig along the transect line and taking of the videos until the camera rig reaches another end of the transect line.

4. The method of claim 1 wherein the matching according to similarity the color, shape and texture features of the cropped fish images with the color, shape and texture features of the pre-collected cropped reference fish images is done through a convolutional neural network.

5. The method of claim 1, further comprising the step of:
   computing a maximum number of fish in the image frames; and
   displaying the fish species, fish length, biomass, and population density values and maximum number of fish in the undistorted and rectified first and second image frames.

6. A computerized system for estimating fish size, population density, species distribution and biomass underwater, the said system comprising:
   at least one paired cameras comprising a first camera and a second camera that is pre-calibrated for taking videos underwater;
   a rig for mounting the paired cameras;
   a processing unit;
   a memory storage device;
   a display device coupled to the processing unit for displaying data; and
   a program module for providing instructions to the processing unit, the processing unit responsive to the instructions of the program module, operable for:
   converting the videos from the first camera in the paired cameras into first image frames and the videos from the second camera in the paired cameras into second image frames, each image frame comprising a multiplicity of pixels;
   processing the first and second image frames by:
   detecting fish images in the first and second image frames;
   generating fish blobs from the fish images;
   generating bounding boxes from the fish blobs;
   rectifying and undistorting the first and second image frames to produce undistorted and rectified first and second image frames by applying the intrinsic, extrinsic and distortion parameters;
   using the fish blobs as image masks to isolate the fish images from the undistorted and rectified image pairs and produce cropped fish images;
   generating a disparity map of pixels from the undistorted and rectified first and second image pairs;
   calculating three dimensional world coordinates of points corresponding to each pixel in the disparity map to generate a point cloud;
   applying the image masks to the point cloud to produce a fish-masked point cloud; and computing pixel coordinates of the fish blob bounding boxes from the cropped fish images;

computing the length of each fish from each of the bounding boxes horizontal coordinate difference between the pixels corresponding to the fish snout and tail;

computing the population density by defining a three dimensional volume in the disparity map and counting the fish within the said volume;

identifying a fish species by:

pre-collecting cropped reference fish images;

extracting color, shape and texture features from the pre-collected cropped reference fish images;

assigning a fish species for each extracted color, shape and texture feature;

extracting color, shape and texture features from the cropped fish images; and matching the color, shape and texture features of the cropped reference fish images with the color, shape and texture features of the pre-collected cropped fish images; and computing the fish biomass given the species and length from a database of fish constants.

7. The computerized system of claim 6 wherein the rig comprises:

a multi-sided frame;

a camera bracket mount on at least one side of the frame;

a plurality of stands supporting the frame;

a handle bar diagonally attached to the frame;

wherein each stand is rotationally coupled to the frame with an adjustable angle relative to the frame and the camera bracket mount is rotationally coupled to the frame with an adjustable tilt.

8. The rig of claim 7 wherein the stands extend at oblique angles to stabilize the frame for sloping and/or uneven seabed surfaces.

* * * * *